United States Patent
Osawa et al.

(10) Patent No.: US 9,441,950 B2
(45) Date of Patent: Sep. 13, 2016

(54) OPTICAL MEASUREMENT APPARATUS AND OPTICAL MEASUREMENT METHOD

(71) Applicant: HITACHI-LG DATA STORAGE, INC., Tokyo (JP)

(72) Inventors: Kentaro Osawa, Tokyo (JP); Daisuke Tomita, Tokyo (JP); Masaki Muko, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 32 days.

(21) Appl. No.: 14/189,159

(22) Filed: Feb. 25, 2014

(65) Prior Publication Data

US 2015/0062589 A1    Mar. 5, 2015

(30) Foreign Application Priority Data

Sep. 4, 2013   (JP) .................................. 2013-182689

(51) Int. Cl.
*G01B 9/02* (2006.01)

(52) U.S. Cl.
CPC ....... *G01B 9/02091* (2013.01); *G01B 9/02027* (2013.01); *G01B 9/02038* (2013.01); *G01B 2290/45* (2013.01)

(58) Field of Classification Search
CPC ..................... G01B 9/02007; G01B 9/02009
USPC ....................................................... 356/497
See application file for complete search history.

(56) References Cited

U.S. PATENT DOCUMENTS

| | | | |
|---|---|---|---|
| 7,177,029 B2 * | 2/2007 | deGroot | 356/497 |
| 2004/0085544 A1 * | 5/2004 | De Groot | 356/497 |
| 2004/0141184 A1 * | 7/2004 | Ueki | 356/497 |
| 2008/0067321 A1 | 3/2008 | Miyamoto et al. | |
| 2010/0181462 A1 | 7/2010 | Sugita | |
| 2012/0300217 A1 | 11/2012 | Yuasa | |

FOREIGN PATENT DOCUMENTS

| | | |
|---|---|---|
| JP | 2008-65961 A | 3/2008 |
| JP | 2010-169503 A | 8/2010 |
| JP | 2011-218155 A | 4/2011 |

OTHER PUBLICATIONS

Toyohiko Yamauchi et al., Label-free imaging of intracellular motility by low-coherent quantitative phase microscopy, Optics Express, Mar. 14, 2011, pp. 5536-5550, vol. 19, No. 6.

* cited by examiner

*Primary Examiner* — Jonathan Hansen
(74) *Attorney, Agent, or Firm* — Baker Botts L.L.P.

(57) ABSTRACT

A small and inexpensive optical measurement apparatus is provided in which noise due to optical interference such as inter-layer crosstalk or speckle is suppressed. The optical measurement apparatus includes a light source to emit laser light, a high-frequency superimposing unit to superimpose a high-frequency current on a driving current to drive the light source, a light branching element to branch the laser light into signal light and reference light, an objective lens to condense and irradiate the signal light on a measurement object, a condensing position scanning unit to scan a condensing position of the signal light, a light path length adjusting unit to adjust a light path length difference between the signal light and the reference light, an interference optical system which combines the signal light reflected or scattered by the measurement object and the reference light, and generates a plurality of interference lights different from each other in phase relation, and a photodetector to detect the interference lights.

10 Claims, 10 Drawing Sheets

OPTICAL MEASUREMENT APPARATUS AND OPTICAL MEASUREMENT METHOD

CROSS-REFERENCE TO RELATED APPLICATION

This application claims the priority of Japanese Patent Application No. 2013-182689, Filed Sep. 4, 2013, which is incorporated herein by reference in its entirety.

BACKGROUND OF THE INVENTION

1. Technical Field

The present invention relates to an optical measurement apparatus and an optical measurement method.

2. Background Art

In recent years, attention is paid to an optical coherence tomography (OCT) to acquire an image reflecting a surface structure or an internal structure of a measurement object by using light (JP-A-2011-218155 (Patent Literature 1)). Since the OCT is non-invasive to the human body, its application to, especially, medical fields and biological fields is expected. In the ophthalmological field, an apparatus to form an image of an eyeground or a cornea is put in practical use. In the OCT, light from a light source is branched into signal light which is irradiated to a measurement object and reference light which is not irradiated to the measurement object but is reflected by a reference light mirror, and a signal is obtained by combining and interfering the signal light reflected from the measurement object and the reference light.

The OCT is roughly classified into a time domain OCT and a Fourier domain OCT according to a scanning method (hereinafter referred to as z-scan) in an optical axis direction of measurement position. In the time domain OCT, a low-coherence light source is used as the light source, and the z-scan is performed by scanning the reference light mirror at the time of measurement. By this, only a component included in the signal light, whose light path length is coincident with that of the reference light, interferes, and a desired signal is demodulated by performing envelope detection on the obtained interference signal.

On the other hand, the Fourier domain OCT is further classified into a wavelength scanning type OCT and a spectrum domain OCT. In the wavelength scanning type OCT, a wavelength scanning type light source capable of scanning the wavelength of emitted light is used, and the z-scan is performed by scanning the wavelength at the time of measurement. A desired signal is demodulated by Fourier transforming the wavelength dependence (interference spectrum) of detected interference light intensity.

In the spectrum domain OCT, a wide-band light source is used as the light source. Generated interference light is spectrally dispersed by a spectroscope, and the interference light intensity (interference spectrum) of each wavelength component is detected, which corresponds to performing the z-scan. A desired signal is demodulated by Fourier transforming the obtained interference spectrum.

Incidentally, as disclosed in JP-A-2010-169503 (Patent Literature 2), in the OCT for the most common eye fundus diagnosis apparatus, an NA of approximately 0.02 is general.

In the related art OCT apparatus described above, there are following problems. In the time domain OCT, the mirror is required to be mechanically scanned at high speed in order to perform the z-scan, and there is a problem that when an angle shift occurs in the optical axis of the reference light by the scanning of the mirror, the signal intensity decreases, and consequently, the SN ratio decreases. In the Fourier domain OCT, the light source to sweep the wavelength at high speed or the spectroscope is required in order to perform the z-scan, and there is problem that both of them are expensive and large, and the OCT apparatus itself becomes expensive and large.

Then, the inventor et al. investigated a structure in which as shown in FIG. 1, a laser light source having a long coherence length is used as a light source, laser light (signal light) is condensed and irradiated on a measurement object by using a high NA objective lens, and a condensing position is scanned by scanning the objective lens, so that a tomographic image of the measurement object is acquired. In the OCT apparatus of this structure, three-dimensional measurement is enabled by separating signals in the optical axis direction by using the principle that a reflected light component included in the signal light, which is from a portion other than the focal point of the objective lens, is different from the reference light in wavefront curvature and does not interfere therewith. This OCT apparatus is basically different in principle from the related art OCT apparatus which uses the wide-band light source (low-coherence light source) or the wavelength scanning type light source. In this structure, since the large and expensive wavelength scanning type light source or spectroscope is not required, the small and inexpensive OCT apparatus can be provided. However, since the laser light having a long coherence length is used, there is a problem that image deterioration due to optical interference such as inter-layer crosstalk or speckle is liable to occur, and a bad effect is exerted on an acquired tomographic image.

SUMMARY OF INVENTION (1) In order to solve the problems, according to an aspect of the invention, a high-frequency superimposing unit is provided in addition to a light source to emit laser light, an optical system to generate interference light from the laser light, and a detector to detect the interference light. In the invention, the laser light emitted from the light source is branched into signal light and reference light, the signal light is condensed and irradiated on a measurement object by an objective lens, the signal light reflected or scattered by the measurement object is combined with the reference light to generate plural interference lights different from each other in phase relation, and those are detected. A condensing position of the signal light is scanned by a condensing position scanning unit. Actually, in a state where high frequency is not superimposed on a driving current, that is, in a state where the coherence length of the laser light is long, a light path length difference between the signal light and the reference light is adjusted by a light path length adjusting unit, and then, high frequency is superimposed on the driving current by a high-frequency superimposing unit, and measurement is performed in a state where the coherence length is short.

By this, since a large and expensive member such as the wavelength scanning type light source or the spectroscope is not required to be used, the small and inexpensive OCT apparatus can be provided. Besides, since a reference light mirror is not required to be scanned unlike the related art time domain OCT, a reduction in SN ratio due to an optical axis shift of the reference light can be prevented. Further, since the measurement is performed in the state where the coherence length is shortened by the high-frequency superimposing unit, the image deterioration due to the optical interference such as the inter-layer cross talk or the speckle can be suppressed.

(2) As an example, a numerical aperture of the objective lens to condense a first light flux on the measurement object is 0.4 or more.

By this, spatial resolution in an optical axis direction comparable to or higher than that of the related art OCT apparatus can be achieved without using the high band light source or the wavelength scanning type light source.

(3) As an example, the coherence length of the laser light obtained when the high frequency is not superimposed on the driving current is not smaller than a maximum value of light path length change of the signal light generated by scanning or simply changing the condensing position of the signal light, and the coherence length of the laser light obtained when the high frequency is superimposed on the driving current is shorter than the coherence length in the case where the high frequency is not superimposed on the driving current. Here, the scanning of the condensing position means moving the condensing position thoroughly in a measurement area in order to acquire an image. On the other hand, the change of the condensing position means an operation of changing the measurement depth when an image on a plane perpendicular to the optical axis is repeatedly acquired while measurement depth is changed.

By this, detection of the reflected light from the measurement object is facilitated in the state where the high frequency is not superimposed on the driving current, that is, in the state where the coherence length of the laser light is long. Thus, the adjustment of the light path length difference between the signal light and the reference light can be easily performed by measuring the light path length of the signal light to the measurement object. Further, the tomographic image of the measurement object is acquired in the state where the high frequency is superimposed on the driving current, that is, in state where the coherence length of the laser light is short. Thus, as compared with the state where the coherence length is long, the inter-layer crosstalk and the speckle can be reduced.

(4) As an example, the light path length adjusting unit is driven to cancel the light path length difference between the signal light and the reference light generated by scanning the condensing position of the signal light in the optical axis direction.

By this, even if the coherence length of the laser light is not larger than the maximum value of the light path length change of the signal light generated by scanning the condensing position of the signal light, interference efficiency between the signal light and the reference light is not reduced, and accordingly, the tomographic image can be acquired. Further, the physical size and refractive index of the measurement object can also be calculated from the movement amount of the objective lens and the light path length adjustment amount.

(5) As an example, the light path length adjusting unit includes a lens, a mirror arranged on a focal plane of the lens and an actuator to modulate positions of the lens and the mirror, and adjusts the light path length of the reference light.

By this, even if the mirror is inclined when the position of the mirror is modulated, an angle of the reference light reflected by the mirror is not changed, and accordingly, reduction in the interference efficiency between the signal light and the reference light can be prevented.

(6) As an example, four interference lights are generated in an interference optical system, the four interference lights are different from each other in interference phase of the signal light and the reference light by approximately integer times of 90 degrees, a pair of the interference lights different from each other in the interference phase of the signal light and the reference light by approximately 180 degrees are detected by a current differential-type photodetector, and, for example, a square-sum operation is performed on the two obtained detection signals.

By this, the stable signal can be obtained which does not depend on the phase difference between the signal light and the reference light and is proportional to the intensity of the signal light. Besides, phase information of the signal light can also be acquired by taking the ratio of the two obtained detection signals and by performing an inverse tangent operation. Further, since the current differential-type detector is used, even if the intensity of the reference light is increased, the detector is hard to be saturated, and the SN ratio of the signal can be made larger than a case where the current differential-type detector is not used.

(7) As an example, the light path length difference between the signal light and the reference light is modulated by a light path length modulation part at higher speed than a change speed of the light path length of the signal light generated by scanning the condensing position of the signal light, two interference lights are generated in the interference optical system, the interference lights are detected by a current differential-type photodetector, and envelope detection is performed on the detection signal.

By this, the desired signal can be acquired by a small number of detectors.

(8) As an example, high-coherence light or low-coherence light emitted from a first light source to emit high-coherence light or a second light source to emit a low-coherence light is branched into signal light and reference light, the signal light is condensed and irradiated on the measurement object by the objective lens, the signal light reflected or scattered by the measurement object is combined with the reference light to generate plural interference lights different from each other in phase relation, and those are detected. The light condensing position of the signal light is scanned by the condensing position scanning unit. Actually, after the light path length difference between the signal light and the reference light is adjusted by the light path length adjusting unit while the high-coherence light is used, the low-coherence light is used to perform measurement. Besides, the coherence length of the high-coherence light is not smaller than the maximum value of the light path length change of the signal light generated by scanning or simply changing the condensing position of the signal light, and the coherence length of the low-coherence light is shorter than the coherence length of the laser light obtained when a high-frequency current is superimposed.

By this, as compared with the structure in which the coherence of the laser light is changed according to whether or not the high-frequency current is superimposed on the driving current supplied to the light source, the image deterioration due to the optical interference such as the inter-layer crosstalk or the speckle can be further suppressed.

Incidentally, as an apparatus using a high-coherence light source and a high NA objective lens, there is, for example, an optical disk reproduction apparatus as disclosed in JP-A-2008-65961 (Patent Literature 3). In the optical disk reproduction apparatus, light is condensed on a recording surface and an optical disk is rotated to acquire a signal, and the acquisition method of the signal is different from that of the OCT apparatus of the invention in which the condensing position is scanned inside the measurement object. Besides, in the optical disk reproduction apparatus, the inter-layer crosstalk can be suppressed by the design of a medium side (optical disk). However, since the OCT is a technique of three-dimensionally measuring a measurement object having an unknown structure in non-invasive and non-contact manner, the inter-layer crosstalk can not be suppressed by operating the measurement object. That is, it is difficult to apply the inter-layer crosstalk suppressing method of the optical disk apparatus to the OCT apparatus.

According to the invention, the optical measurement apparatus can be provided in which a tomographic image of a measurement object is acquired without using the wavelength scanning type light source or the spectroscope, and the image deterioration due to the optical interference such as the inter-layer crosstalk or the speckle can be suppressed.

Problems, structures and effects other than the above will be clarified by the following description of the embodiments.

DESCRIPTION OF PREFERRED EMBODIMENTS

Figure 1:
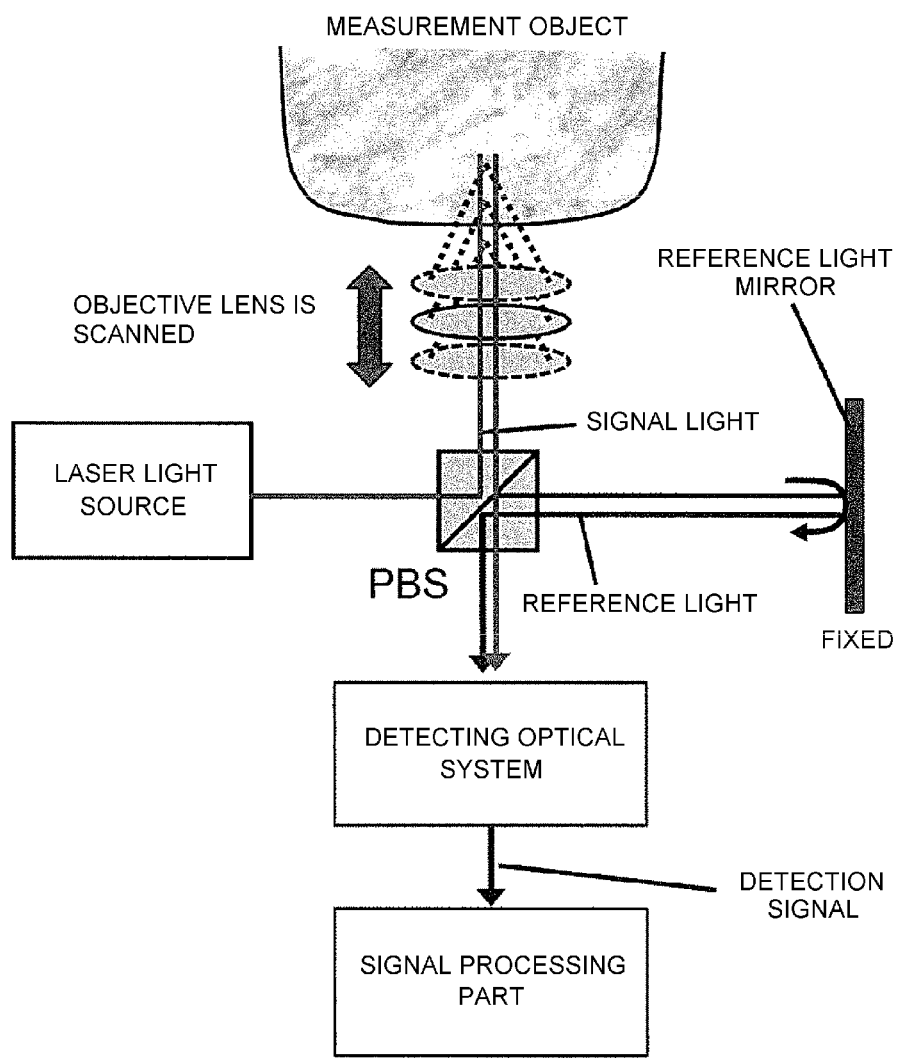
FIG. 1 is a schematic view showing a structure of an OCT apparatus investigated by the inventor et al.
Figure 2:
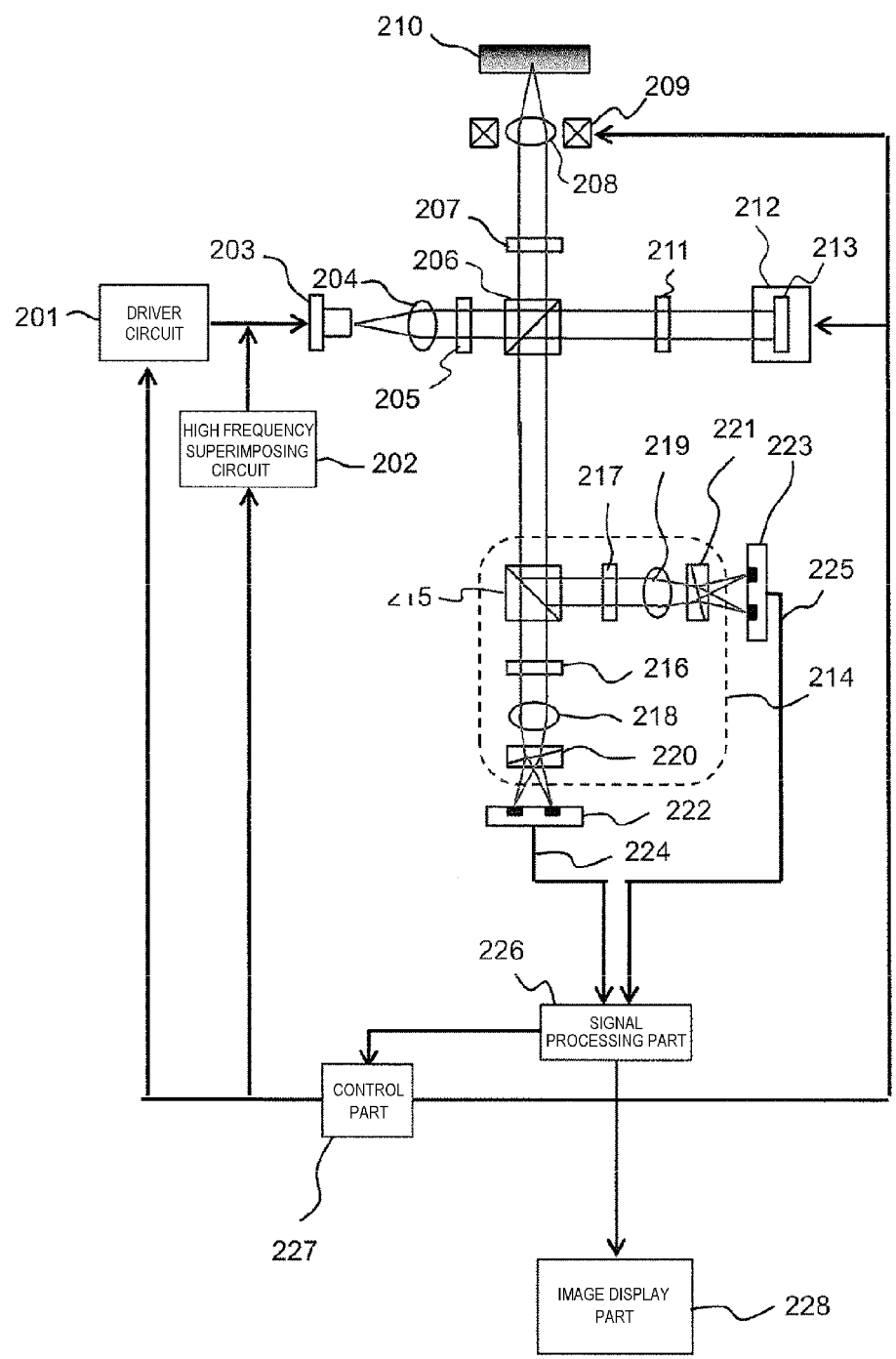
FIG. 2 is a schematic view showing a structural example of an optical measurement apparatus of the invention.

Hereinafter, embodiments of the invention will be described with reference to the drawings.
Embodiment 1
FIG. 2 is a schematic view showing a basic embodiment of an optical measurement apparatus of the invention.

A driver circuit 201 or a high-frequency superimposing circuit 202 supplies current, and a light source 203 emits laser light. The laser light is converted into parallel light by a collimate lens 204, and after the polarization is rotated by a λ/2 plate 205 whose optical axis direction can be adjusted, the light is branched into signal light and reference light by a polarization beam splitter 206. The signal light passes through a λ/4 plate 207 whose optical axis direction is set at about 22.5 degrees with respect to the horizontal direction, and after the polarization state is converted from s-polarization to circular polarization, the signal light is condensed by an objective lens 208 having a numerical aperture of 0.4 or more and is irradiated on a measurement object 210. Here, the objective lens 208 is scanned by an objective lens actuator 209 under control of a control part 227, and by this, the scanning of the condensing position (measurement position) of the signal light by the objective lens 208 is performed. A reflected light component from the focal position of the objective lens included in the signal light reflected or scattered from the measurement object is converted into parallel light by the objective lens 208, the polarization state is converted from the circular polarization to p-polarization by the λ/4 plate 207, and the reflected light component is incident on the polarization beam splitter 206.

On the other hand, the reference light passes through a λ/4 plate 211, and the polarization state is converted from p-polarization to circular polarization. Then, the reference light is incident on and is reflected by a mirror 213 arranged on a movement stage 212 as a light path adjustment unit. Thereafter, the polarization state is converted from the circular polarization to s-polarization by the λ/4 plate 211, and the reference light is incident on the polarization beam splitter 206.

The signal light and the reference light are combined by the polarization beam splitter 206, and combined light is generated. The combined light is guided to an interference optical system 214 including a half beam splitter 215, a λ/2 plate 216, a λ/4 plate 217, condensing lenses 218 and 219, and Wollaston prisms 220 and 221.

The combined light incident on the interference optical system 214 is branched into transmitted light and reflected light by the half beam splitter 215. The transmitted light passes through the λ/2 plate 216 whose optical axis is set at about 22.5 degrees with respect to the horizontal direction, and then is condensed by the condensing lens 218 and is polarization separated by the Wollaston prism 220. As a result, a first interference light and a second interference light different from each other in phase relation by 180 degrees are generated. The first interference light and the second interference light are detected by a current differential-type photodetector 222, and a signal 224 proportional to the difference between those intensities is outputted.

On the other hand, the reflected light passes through the λ/4 plate 217 whose optical axis is set at about 45 degrees with respect to the horizontal direction, and then is condensed by the condensing lens 219 and is polarization separated by the Wollaston prism 221. As a result, a third interference light and a fourth interference light different from each other in phase relation by 180 degrees are generated. Here, the third interference light is different from the first interference light in phase by 90 degrees. The third interference light and the fourth interference light are detected by a current differential-type photodetector 223, and a signal 225 proportional to the difference between those intensities is outputted. The signals 224 and 223 generated in this way are inputted to a signal processing part 226 and are calculated, so that a signal proportional to the amplitude of the signal light is obtained. A tomographic image of the measurement object formed based on this signal is displayed on an image display part 228.

Here, the operation principle of the interference optical system 214 will be described in detail with reference to mathematical expressions. When a Jones vector of the combined light at the time of incidence on the interference optical system 214 is expressed by:

$$\begin{pmatrix} E_{sig} \\ E_{ref} \end{pmatrix} \tag{1}$$

the Jones vector of the combined light after passing through the half beam splitter 215 and passing through the λ/2 plate 216 is expressed as follows.

$$\begin{pmatrix} 1/\sqrt{2} & -1/\sqrt{2} \\ 1/\sqrt{2} & 1/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} E_{sig} - E_{ref} \\ E_{sig} + E_{ref} \end{pmatrix} \quad (2)$$

The combined light expressed by Expression (2) is polarization separated into a p-polarization component and an s-polarization component by the Wollaston prism 220, and then is differentially detected by the current differential-type photodetector 222. Thus, the detection signal 224 is expressed as follows.

$$I = \frac{1}{4}|E_{sig} + E_{ref}|^2 - \frac{1}{4}|E_{sig} - E_{ref}|^2 \quad (3)$$
$$= |E_{sig}||E_{ref}|\cos(\theta_{sig} - \theta_{ref})$$

Here, $\theta_{sig}$ and $\theta_{ref}$ respectively denote phases obtained when complex numbers $E_{sig}$ and $E_{ref}$ are expressed in polar coordinates. For simplicity, it is assumed that the conversion efficiency of the detector is 1.

On the other hand, the Jones vector of the combined light after being reflected by the half beam splitter 215 and passing through the λ/4 plate 217 is expressed as follows.

$$\begin{pmatrix} i/\sqrt{2} & 1/\sqrt{2} \\ 1/\sqrt{2} & i/\sqrt{2} \end{pmatrix} \begin{pmatrix} E_{sig}/\sqrt{2} \\ E_{ref}/\sqrt{2} \end{pmatrix} = \frac{1}{2}\begin{pmatrix} i(E_{sig} - iE_{ref}) \\ E_{sig} + iE_{ref} \end{pmatrix} \quad (4)$$

The combined light expressed by Expression (4) is polarization separated into a p-polarization component and an s-polarization component by the Wollaston prism 221, and then is differentially detected by the current differential-type photodetector 223. Thus, the detection signal 223 is expressed as follows.

$$Q = \frac{1}{4}|E_{sig} + iE_{ref}|^2 - \frac{1}{4}|E_{sig} - iE_{ref}|^2 \quad (5)$$
$$= |E_{sig}||E_{ref}|\sin(\theta_{sig} - \theta_{ref})$$

The signal processing part 226 performs the following calculation on these outputs, so that the signal independent on the phase and proportional to the intensity of the signal light is obtained.

$$|E_{sig}|^2|E_{ref}|^2 = I^2 + Q^2 \quad (6)$$

As described above, in the interference optical system 214, the four interference lights different from each other in phase by 90 degrees are generated and detected, so that the signal independent on the phase is obtained. However, in principle, if three or more interference lights are generated, a similar signal can be obtained irrespective of the number of the interference lights. For example, if three interference lights different from each other in phase by 60 degrees are generated and are detected, the same signal as one expressed by Expression (6) can be obtained.

Figure 3A:
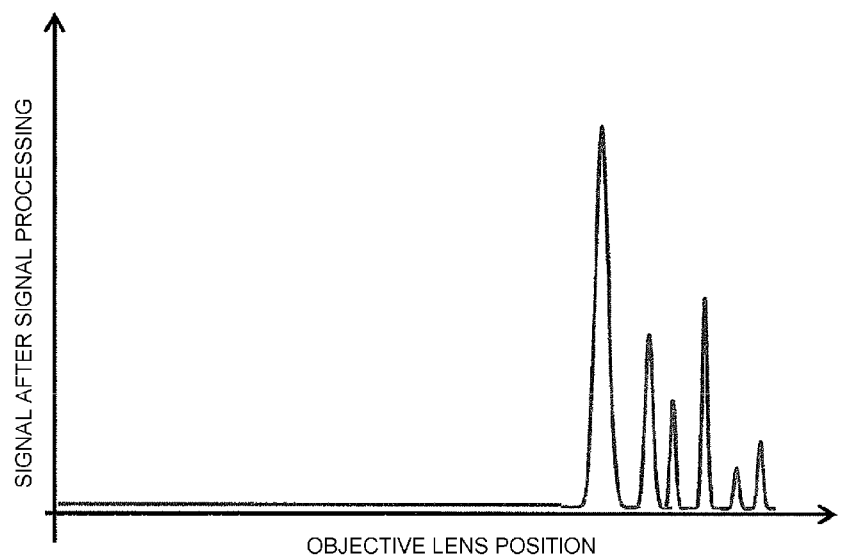
FIGS. 3A and 3B are schematic views of a signal obtained when an objective lens is scanned in an optical axis direction in the optical measurement apparatus of the invention.
Figure 10:
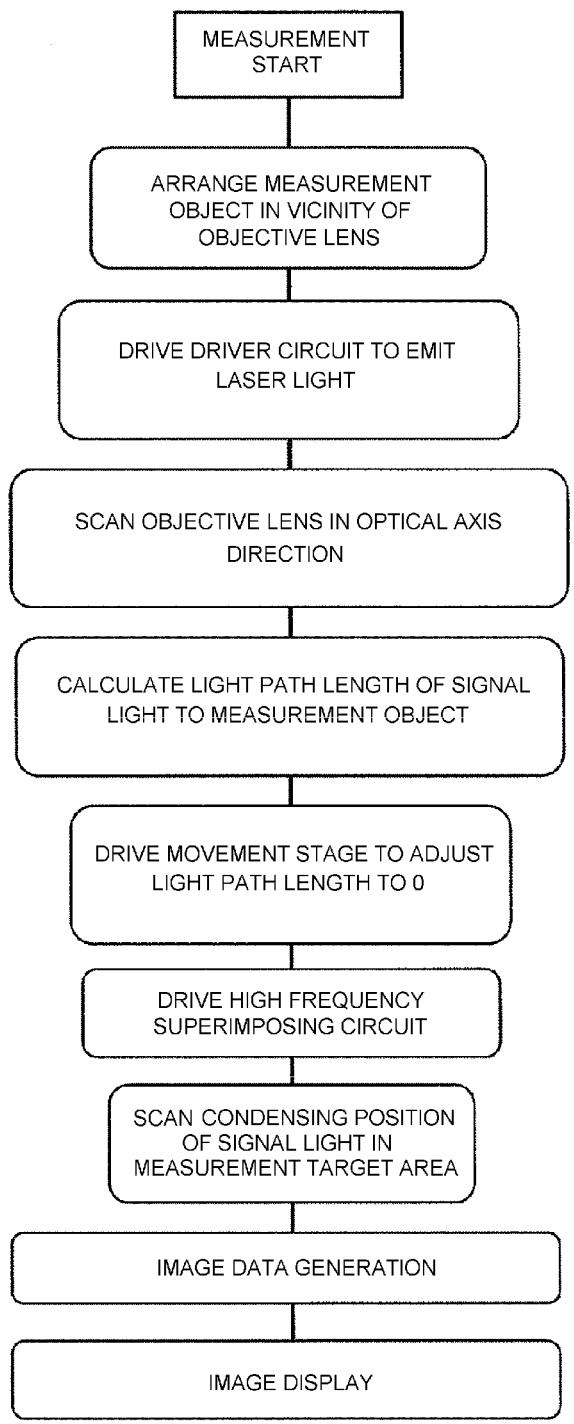
FIG. 10 is a view for explaining an operation procedure of an OCT apparatus.

Next, the operation of the OCT apparatus of the invention will be described. The operation procedure is shown in FIG. 10. First, the measurement object 210 is arranged in the vicinity of the objective lens 208. Next, the control part 227 controls the driver circuit 201 to supply current to the light source and causes laser light having a long coherence length to be emitted, and scans the objective lens 208 in the optical axis direction. In this embodiment, the light source is used in which the coherence length of the emitted laser light is longer than the light path length change of the signal light generated by scanning the objective lens. Thus, if the measurement object is arranged in the scanning range of the condensing position, a signal from the measurement object as shown in, for example, FIG. 3A can be obtained. By obtaining the data as shown in FIG. 3A, the position information of the objective lens 208 when the signal from the measurement object is detected can be obtained. Thus, the light path length of the signal light to the measurement object can be calculated. The control part 227 drives the movement stage 213 based on the light path length of the signal light to the measurement object calculated by the signal processing part 226, and adjusts so that the difference between the light path length of the signal light to the measurement object and the light path length of the reference light becomes almost 0. After the adjustment of the light path length is completed, the control part 227 drives the high-frequency superimposing circuit 202 to superimpose a high-frequency current on the driving current of the light source. By this, the coherence length of the laser light becomes shorter than that of the case where the high-frequency current is not superimposed. Thereafter, the control part 227 scans the objective lens actuator to scan the condensing position in the measurement target area of the measurement object. The signal processing part 226 generates the image data based on the detection signals 224 and 225, and displays it on the image display part. Here, the frequency of the high-frequency current is assumed to be higher than the response frequency of the detector. By this, since the light intensity signal modulated by the high-frequency current is not detected, only the signal reflecting the information of the measurement object can be detected.

Incidentally, here, although the example is described in which the objective lens itself is scanned, it is sufficient if the condensing position is scanned. Thus, it is not necessarily required to scan the objective lens itself, and an electric focus variable lens, a galvano mirror and the like may be used.

Figure 3B:
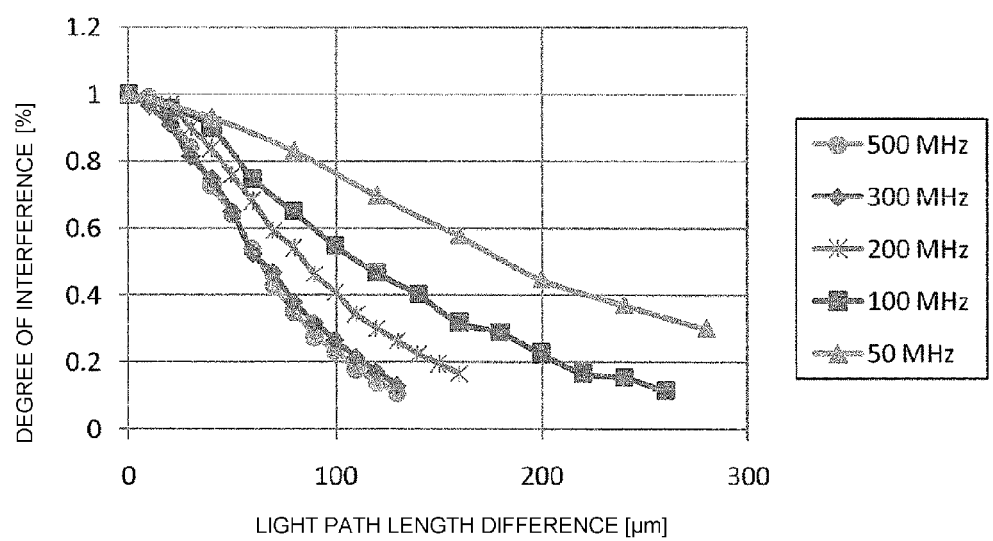

Next, an experimental example of high-frequency superimposition will be described. The coherence length at the time of high-frequency current superimposition varies according to conditions such as the characteristic of a light source and the frequency and amplitude of high-frequency current to be superimposed. As an example, FIG. 3B shows the coherence of the laser light when high-frequency currents of different frequencies are superimposed on the light source having an oscillation wavelength of 785 nm. In general, there is a tendency that as the frequency of the high-frequency current is increased, the coherence length becomes short and hardly changes at a certain frequency or higher. The coherence length of the laser light at the time of measurement is preferably smaller than the scale of a structure of a measurement object. When the measurement object having a structure of about 100 μm is measured by the light source having the characteristic shown in FIG. 3B, the measurement is performed at a frequency of about 200 MHz or higher (coherence of about 100 μm or less). Here, the coherence length is defined as a light path length in which the degree of interference is 50%.

Figure 4A:
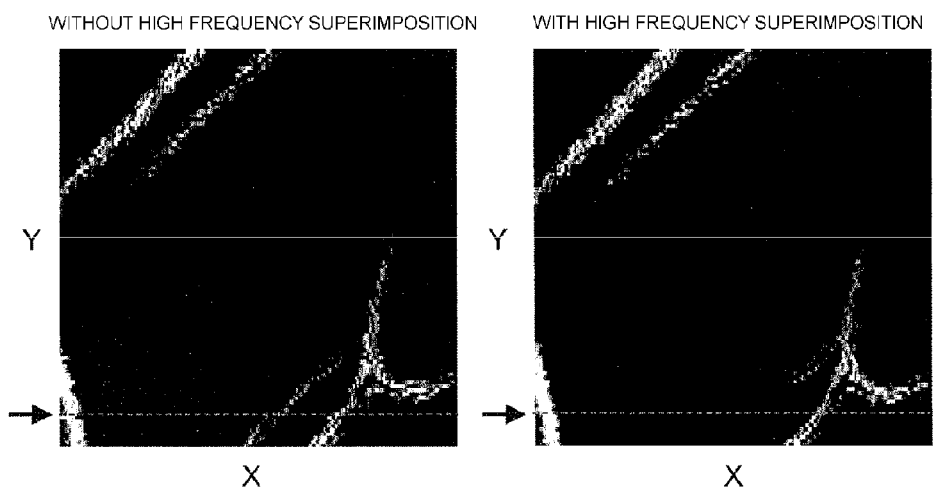
FIGS. 4A and 4B are views showing a tomographic image of an onion cell measured using the optical measurement apparatus of the invention.
Figure 4B:
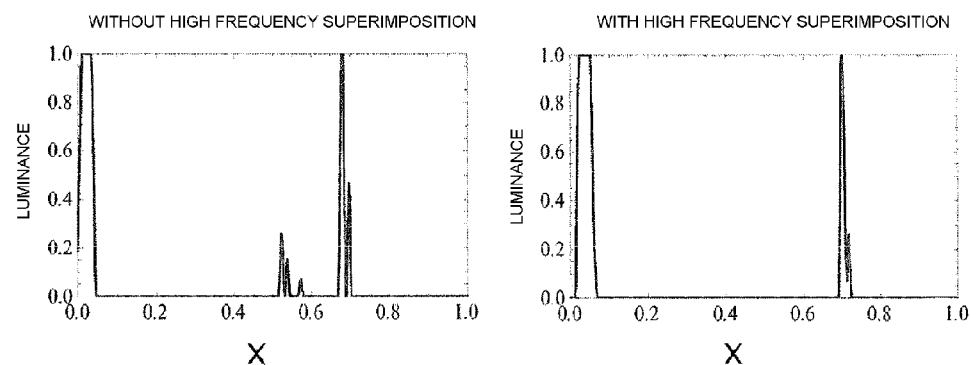

In this embodiment, since the spectroscope or the wavelength scanning type light source is not used unlike the related art OCT apparatus, the small and inexpensive OCT apparatus can be provided. Further, since the coherence of the laser light can be controlled, as stated above, the light path length adjustment is performed in the state where the coherence length is long, and the measurement can be performed in the state where the coherence length is short. By this, the light path length adjustment can be easily performed, and the inter-layer crosstalk and the speckle can be reduced. If the high-bandwidth light source (low-coherence light source) used in the related art OCT is used in this embodiment, when the measurement object is arranged in the scan range of the condensing position, and the light path length of the signal light to the measurement object and the light path length of the reference light are not coincident with each other at the time of arrangement of the measurement object, a signal from the measurement object is not obtained. Accordingly, the light path length adjustment becomes difficult. FIGS. 4A and 4B show results obtained when an onion cell is measured by using the OCT apparatus of this embodiment under two conditions, that is, a case where a high-frequency current is not superimposed and a case where a high-frequency current is superimposed. A measurement area of an image of FIG. 4A is 100 μm μm×100 μm, and a tomographic image is in a plane (xy plane when the optical axis direction is a z-direction) vertical to the optical axis. A white streak in the image indicates the cell wall of the onion, and it is understood that although the image of the cell wall is seen when the high-frequency current is not superimposed, the image disappears when the high-frequency current is superimposed. FIG. 48 shows luminance distributions of the respective images in the x-direction at the arrow position of FIG. 4A. It is clearly confirmed that the peak at the x-position of 0.6 to 0.7 in the case of without the high-frequency superimposition disappears in the case of with the high-frequency superimposition. This means that leakage (inter-layer crosstalk) of signals from different depth positions is suppressed by the high-frequency superimposition.

Next, the spatial resolution of the OCT apparatus of the invention will be described. Here, the spatial resolution in the optical axis direction is defined as a full width at half maximum of a peak corresponding to a single reflection surface obtained when the objective lens is scanned in the optical axis direction. A signal corresponding to Expression (6) when the focal position is shifted from the reflection surface by z is expressed by the following expression.

$$sig(z) = |E_s|^2 |E_r|^2 \mathrm{sinc}^2\left(\pi \cdot \frac{z}{\lambda} NA^2\right) \quad (7)$$

From the above expression, the full width at half maximum of the signal from the single reflection surface, that is, the spatial resolution in the optical axis direction is approximately expressed as follows.

$$0.886 \frac{\lambda}{NA^2} \quad (8)$$

Here, λ denotes the wavelength of the laser light, and NA denotes the numerical aperture of the objective lens 208. In general, the wavelength of light used in the OCT apparatus is about 600 nm to 1300 nm, which is hard to be absorbed by hemoglobin or water. For example, if the numerical aperture of the objective lens is 0.4 or more, the spatial resolution in the optical axis direction at the wavelength of 600 nm to 1300 nm is about 3.3 μm to 7.2 μm, and the resolution in the optical axis direction comparable to or higher than that of the related art OCT apparatus can be achieved.

Besides, in this embodiment, the phase information of the signal light can also be acquired by performing the follow calculation.

$$\theta_{sig} - \theta_{ref} = \arctan\left(\frac{Q}{I}\right) \quad (9)$$

A utilization method of the phase information of the signal light is imaging of cell activity as disclosed in Optics Express Vol. 19, 5536-5550 (2011) (Non-Patent Literature 1).

Embodiment 2

Figure 5:
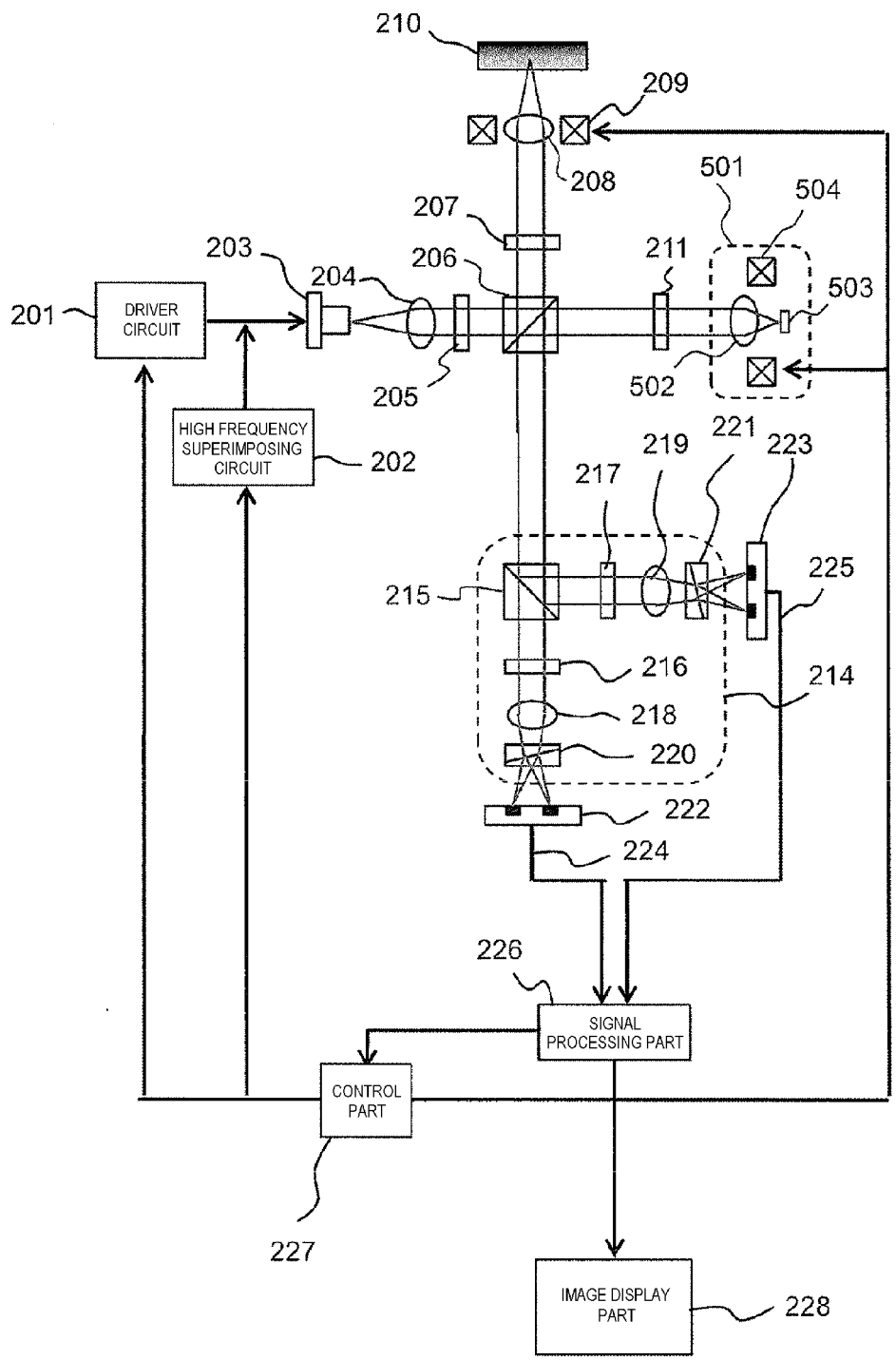
FIG. 5 is a schematic view showing a structural example of the optical measurement apparatus of the invention.

FIG. 5 is a schematic view showing another embodiment of the optical measurement apparatus of the invention. Incidentally, the same parts as those shown in FIG. 2 are denoted by the same reference numerals and their explanation is omitted. This embodiment is different from the first embodiment in that a light path length adjusting unit 501 to adjust by synchronizing the light path length of reference light with the light path length change of signal light at the time of measurement is provided. The light path length adjusting unit 501 includes a condensing lens 502, a mirror 503 arranged so that the reflection surface is positioned on the focal plane of the condensing lens 502, and a light path length adjusting actuator 504 for integrally moving the condensing lens 502 and the mirror 503.

The operation procedure of the OCT apparatus of this embodiment is similar to the first embodiment up to the point that after a measurement object 210 is arranged in the vicinity of an objective lens 208, data as shown in FIG. 3 is acquired, and a high-frequency current is superimposed on a driving current. This operation procedure is different only in that although the light path length adjustment is performed by the movement stage 212 and the mirror 213 in the first embodiment, the light path length adjusting unit 501 is used in the second embodiment. Hereinafter, a description will be made on a case where a tomographic image in an xz direction of a measurement object is acquired (z-direction indicates an optical axis direction, and an x-direction indicates a direction perpendicular to the optical axis direction). A control part 227 scans a condensing position in a measurement target area of the measurement object by scanning an objective lens actuator, and simultaneously drives the light path length adjusting actuator 504 so as to cancel out the light path length difference between the signal light and the reference light generated by scanning the condensing position. Specifically, when the average refractive index of the measurement object is n, the condensing position is changed approximately by n×δz by moving the position of the objective lens 208 in the optical axis direction by δz. Thus, the light path length of the signal light is changed by approximately 2×n²×δz when reciprocating. Accordingly, the increase of the light path length difference between the signal light and the reference light can be suppressed by changing the light path length of the reference light by approximately 2×n²×δz by the light path length adjusting unit 501 in synchronization with the movement of the objective lens 208. Even if the refractive index of the measurement object is unknown or is spatially significantly changed in the measurement area, when n=1 is set, the effect of suppressing the increase of the light path length difference can be obtained.

In this embodiment, since the increase of the light path length difference between the signal light and the reference light at the time of measurement is suppressed, even if the light path length of the signal light is changed more than the coherence length of the laser light at the time of measurement, reduction in interference efficiency between the signal light and the reference light can be suppressed. Accordingly, measurement can be performed in the range wider than the coherence length of the laser light in the optical axis direction. Further, even if the mirror 503 is inclined, since the angle of the reference light reflected by the mirror 503 is not changed, the reduction in the interference efficiency between the signal light and the reference light can be prevented.

Figure 6A:
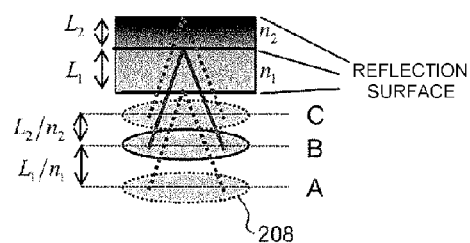
FIGS. 6A to 6E are schematic views showing an example of an actual scan path of a condensing position.
Figure 6B:
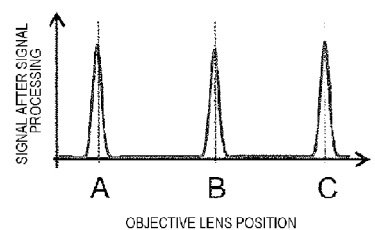
Figures 6C, 6D, 6E:
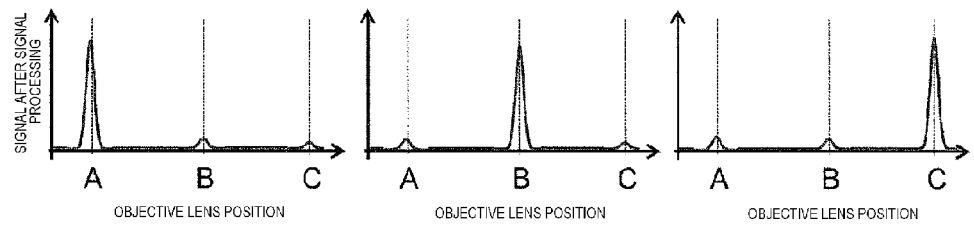

In the following, a measurement method of refractive index and physical length of a measurement object, which is another function of the invention, will be described. As an example, a description will be made on a measurement object as shown in FIG. 6A, in which three reflection surfaces exist, physical length and refractive index between a first reflection surface and a second reflection surface are respectively $L_1$ and $n_1$, and physical length and refractive index between the second reflection surface and a third reflection surface are respectively $L_2$ and $n_2$. First, the objective lens 208 is scanned in the optical axis direction in a state where coherence length is long, and a signal as shown in FIG. 6B is acquired. The light path length of the signal light to the surface (first reflection surface) of the measurement object is calculated based on this signal, and the light path length adjusting unit 501 is driven to adjust so that the difference between the light path length of the signal light to the surface of the measurement object and the light path length of the reference length becomes almost 0, and then a position $X_A$ of the mirror 503 at this time is recorded. Next, a high-frequency current is superimposed on a driving current. Since the light path length difference is adjusted with respect to the first reflection surface, signal amplitudes from the second reflection surface and the third reflection surface become almost 0, and a signal as shown in FIG. 6C is obtained. Similarly, the light path length adjusting unit 501 is again driven to adjust the light path length of the reference light so that the signal amplitude from the second reflection surface becomes maximum as shown in FIG. 6D, and position $X_B$ of the mirror 503 at this time is recorded. Similarly, the light path length of the reference light is adjusted so that the signal amplitude from the third reflection surface becomes maximum as shown in FIG. 6E, and position $X_C$ of the mirror 503 at this time is recorded. The following calculation is performed on the obtained $X_A$, $X_B$ and $X_C$ and the positions A, B and C of the objective lens 208 at the instance when the signal amplitudes from the respective reflection surfaces become maximum, so that $L_1$, $n_1$, $L_2$ $n_2$ can be obtained.

$$L_1 = \sqrt{(B-A)(X_B-X_A)}$$

$$L_2 = \sqrt{(C-B)(X_C-X_B)}$$

$$n_1 = \sqrt{(X_B-X_A)/(B-A)}$$

$$n_2 = \sqrt{(X_C-X_B)/(C-B)} \tag{10}$$

This function can be used when the coherence length of the laser light at the time of the high-frequency current superimposition is shorter than the light path length between the reflection surfaces.

Embodiment 3

Figure 7:
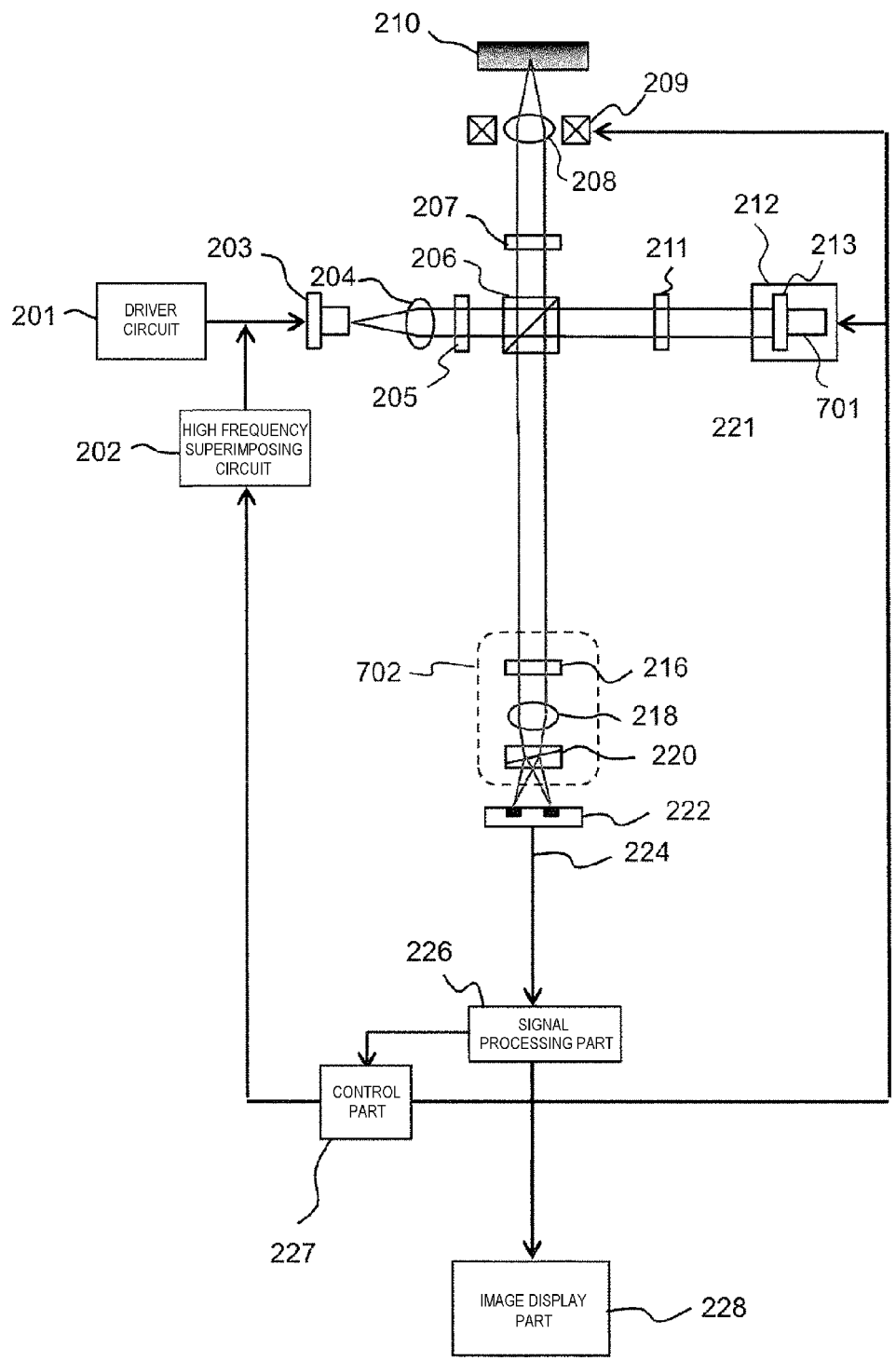
FIG. 7 is a schematic view showing a structural example of the optical measurement apparatus of the invention.

FIG. 7 is a schematic view showing another embodiment of the invention. Incidentally, the same parts as those shown in FIG. 2 are denoted by the same reference numerals and their explanation is omitted. A structure in which laser light is emitted from a light source 203, and signal light and reference light are combined to generate a combined light is almost the same as that of the first embodiment. However, a difference is that a mirror 213 is mounted on a piezo actuator 701 for modulating the phase of the reference light at high speed. The combined light is guided to an interference optical system 702 including a λ/2 plate 216, a condensing lens 218 and a Wollaston prism 220. The combined light incident on the interference optical system 602 passes through the λ/2 plate 216 whose optical axis is set at about 22.5 degrees with respect to the horizontal direction, and then is condensed by the condensing lens 218 and is polarization separated by the Wollaston prism 220. As a result, a first interference light and a second interference light different from each other in phase relation by 180 degrees are generated. The first interference light and the second interference light are detected by a current differential-type photodetector 222, and a signal 224 proportional to the difference between those intensities is outputted. The signal 224 is expressed by the following expression.

$$I = 4|E_{sig}||E_{ref}|\cos(\theta_{sig}-\theta_{ref}) \tag{11}$$

Figure 8A:
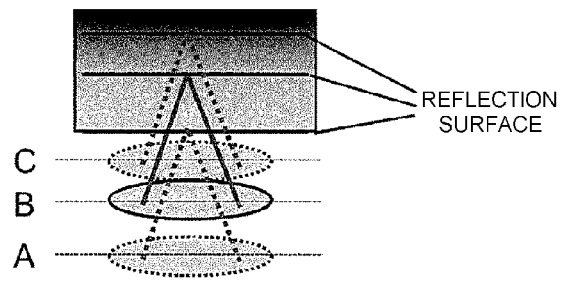
FIGS. 8A to 8c are schematic views of a signal obtained when an objective lens in the optical measurement apparatus of the invention is scanned in an optical axis direction.
Figure 8B:
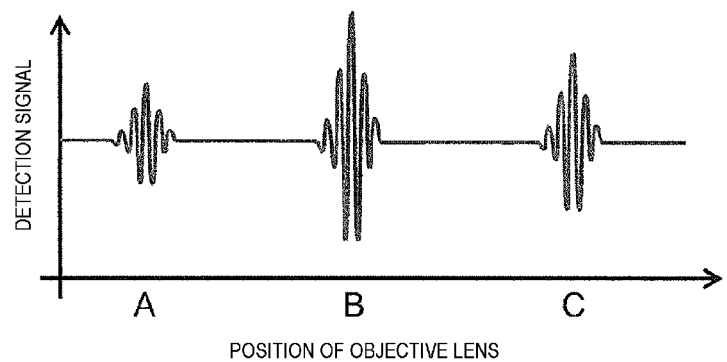
Figure 8C:
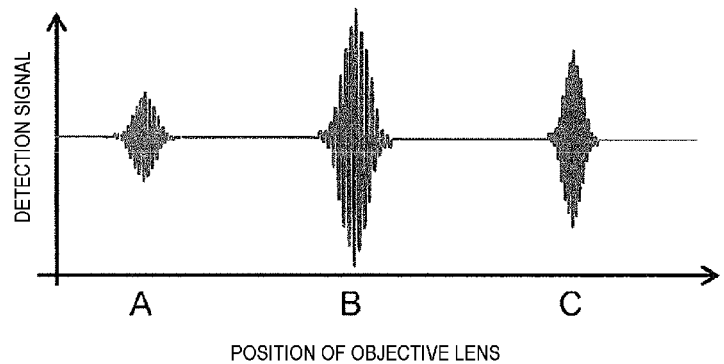

In this embodiment, the piezo element 701 is driven at the time of signal acquisition, and the phase of the reference light is modulated at higher speed than the phase change of the signal light generated by scanning an objective lens 208. FIGS. 8A to 8C are views for explaining a signal detected by using the OCT apparatus of this embodiment when the objective lens 208 is scanned in the z-direction. Here, FIGS. 8B and 8C shows detection signals obtained when a measurement object has three reflection surfaces as shown in FIG. 8A. FIG. 8B is a schematic view of the signal obtained when the piezo actuator 701 is not driven. In this case, the number of waves included in the envelope of a signal from a certain reflection surface is approximately given by (peak width of the signal)÷(wavelength). When the wavelength of the laser light is λ, and the numerical aperture of the objective lens is NA, since the peak width of the signal is expressed by $\lambda/NA^2$, (peak width of the signal)÷(wavelength)=$1/NA^2$ is established. For example, in the case of NA=0.6, this value is about 2.8. Accordingly, since the frequency of the envelope and the frequency of the wave included therein are different from each other merely by a factor of about 2.8, the application of the envelope detection is difficult, and image data can not be generated based on the detection signal. On the other hand, when the piezo actuator 701 is driven, the signal as shown in FIG. 8C is obtained. In this case, since the phase of the reference light is modulated at high speed while the condensing position of the signal light passes through the reflection surface, the number of waves included in the envelope of a signal from a certain reflection surface increases according to the speed of the phase modulation. By this, since the frequency of the envelope and the frequency of the wave included therein are significantly different from each other, the envelope detection can be applied, and image data can be generated based on the detection signal. That is, in this embodiment, unlike the first embodiment, since a desired signal can be acquired from the detection signal by the envelope detection, the same function can be realized by a smaller number of detectors than the embodiment 1.

Embodiment 4

Figure 9:
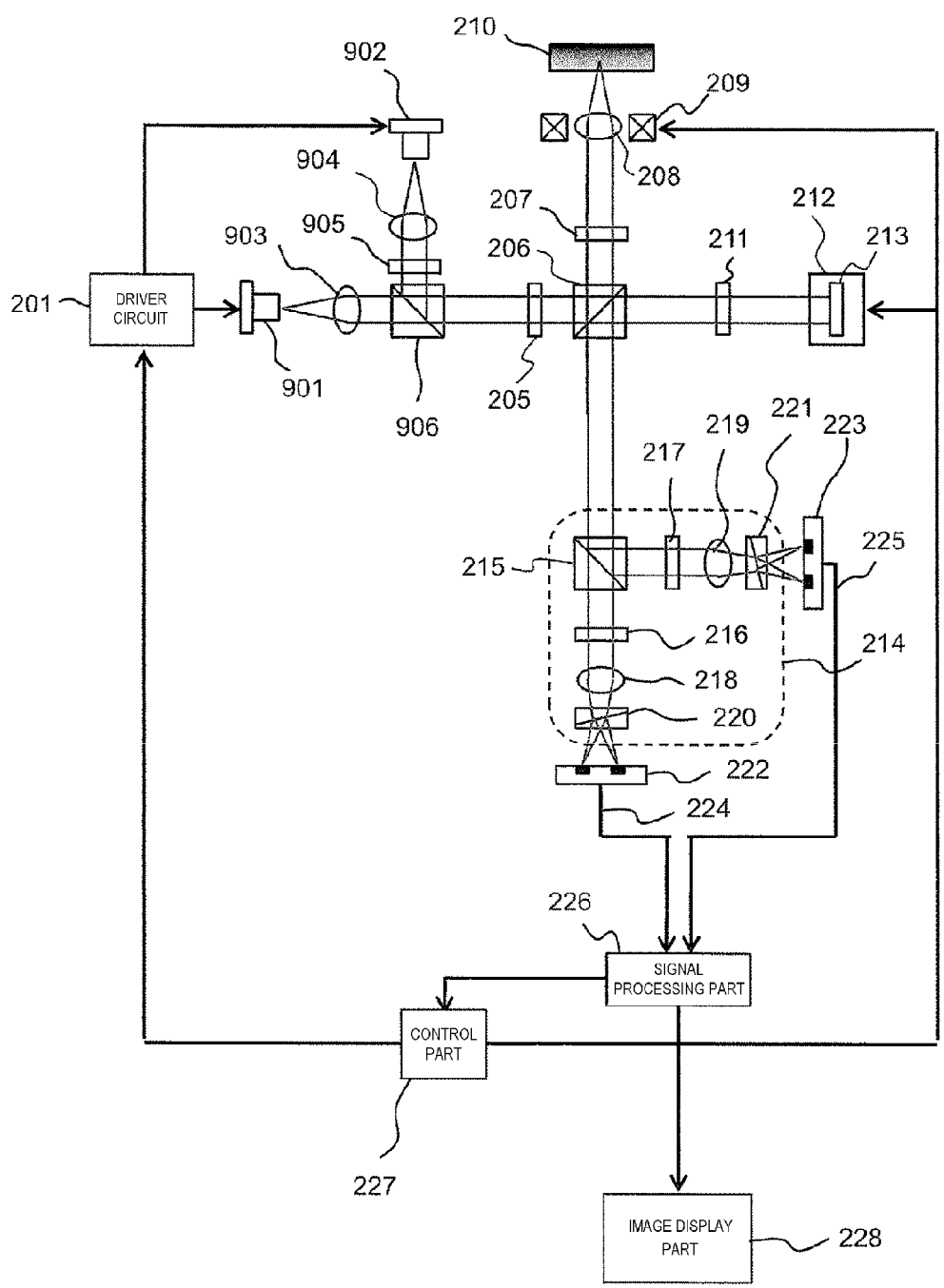
FIG. 9 is a schematic view showing a structural example of the optical measurement apparatus of the invention.

FIG. 9 is a schematic view showing another embodiment of the invention. Incidentally, the same parts as those shown in FIG. 2 are denoted by the same reference numerals and their explanation is omitted. This embodiment is different from the first embodiment in that two kinds of light sources, that is, a high-coherence light source 901 and a low-coherence light source 902 are included. Laser light emitted from the high-coherence light source is converted into parallel light by a collimate lens 903, and passes through a polarization beam splitter 906, and then is incident on a λ/2 plate 205. On the other hand, laser light emitted from the low-coherence light source 902 is converted into parallel light by a collimate lens 904, and then, the polarization state is adjusted into an s-polarization state by a λ/2 plate 905, and the laser light is reflected by the polarization beam splitter 906 and is incident on the λ/2 plate 205. Since the path of the laser light thereafter is the same as that in the first embodiment, a description thereof is omitted here.

In the following, the operation of the OCT apparatus of this embodiment will be described. First, a measurement objet 210 is arranged in the vicinity of an objective lens 208. Next, a control part 227 controls a driver circuit 201 to supply current to the high-coherence light source 901 and to cause laser light of long coherence length to be emitted, and scans the objective lens 208 in an optical axis direction. In this embodiment, the high-coherence light source 901 is used in which the coherence length of the emitted laser light is longer than the light path length change of the signal light generated by scanning the objective lens. Thus, if the measurement object is arranged in the scanning range of the condensing position, a signal from the measurement object as shown in, for example, FIG. 3A can be obtained. By acquiring data as shown in FIG. 3A, position information of the objective lens 208 obtained when the signal from the measurement object is detected can be acquired. Thus, the light path length of the signal light to the measurement object can be calculated. The control part 227 drives a movement stage 213 based on the light path length of the signal light to the measurement object calculated by a signal processing part 226, and adjusts so that a difference between the light path length of the signal light to the measurement object and the light path length of the reference light becomes almost 0. After the adjustment of the light path length is completed, the control part 227 controls the driver circuit 201 to stop the supply of the current to the high-coherence light source 901, and supplies current to the low-coherence light source to cause laser light of short coherence length to be emitted. Thereafter, the control part 227 scans the objective lens actuator to scan the condensing position in a measurement target area of the measurement object. The signal processing part 226 generates image data based on detection signals 224 and 225, and displays it on an image display part.

In this embodiment, since the high-coherence light and the low-coherence light can be used, as described above, the light path length adjustment is performed in the state where the coherence length is long, and the measurement can be performed in the state where the coherence length is short. Besides, as compared with the case of the first embodiment in which one light source is used, and the coherence length of the laser light is changed by the presence or absence of the high-frequency current superimposition, the coherence length of the laser light at the time of measurement can be further shortened according to the light source to be applied. By this, the inter-layer crosstalk or the speckle can be further reduced.

What is claimed is:

1. An optical measurement apparatus comprising:
a light source to emit laser light;
a high-frequency superimposing unit to superimpose a high-frequency current on a driving current to drive the light source;
a light branching element to branch the laser light into signal light and reference light;
an objective lens to condense and irradiate the signal light on a measurement object;
a condensing position scanning unit to scan a condensing position of the signal light by scanning at least the objective lens;
a light path length adjusting unit to adjust a light path length difference between the signal light and the reference light, the light path length adjusting unit including a mirror to reflect the reference light and a movement stage to move the mirror, and the light path length difference is adjusted by moving the movement stage;
an interference optical system which combines the signal light reflected or scattered by the measurement object and the reference light, and generates a plurality of interference lights different from each other in phase relation; and
a photodetector to detect the interference lights,
wherein in a state where the high-frequency current is not superimposed on the driving current, the light path length difference between the signal light and the reference light is adjusted by the light path length adjusting unit, and when the high-frequency current is superimposed on the driving current by a high-frequency superimposing unit, measurement is performed.

2. The optical measurement apparatus according to claim 1, wherein the objective lens has a numerical aperture of 0.4 or more.

3. The optical measurement apparatus according to claim 1, wherein coherence length of the laser light obtained when the high frequency is not superimposed on the driving current is not smaller than a maximum value of light path length change of the signal light generated by scanning or simply changing the condensing position of the signal light, and
coherence length of the laser light obtained when the high frequency is superimposed on the driving current is shorter than the coherence length obtained when the high frequency is not superimposed on the driving current.

4. The optical measurement apparatus according to claim 1, wherein the light path length adjusting unit is driven to cancel out the light path length difference between the signal light and the reference light generated by scanning the condensing position of the signal light in an optical axis direction.

5. The optical measurement apparatus according to claim 1, wherein the light path length adjusting unit includes a lens, a mirror arranged on a focal plane of the lens, and an actuator to modulate positions of the lens and the mirror.

6. The optical measurement apparatus according to claim 1, wherein the number of the interference lights generated in the interference optical system is four, interference phases of the signal light and the reference light are different from each other by approximately integer times of 90 degrees, and
the photodetector of current differential type detects a pair of the interference lights in which the interference phases of the signal light and the reference light are different from each other by approximately 180 degrees.

7. The optical measurement apparatus according to claim 1, further comprising a light path length modulation part to module the light path length difference between the signal light and the reference light at higher speed than a change speed of a light path length of the signal light generated by scanning the condensing position of the signal light,
    wherein the number of the interference lights generated in the interference optical system is two, and
    the interference lights are detected by the photodetector of current differential type.

8. The optical measurement apparatus according to claim 1, wherein a frequency of the high-frequency current is larger than a response frequency of the photodetector.

9. An optical measurement method comprising:
    branching laser light emitted from a light source into signal light and reference light;
    scanning a condensing position of the signal light by scanning at least the objective lens;
    condensing and irradiating the signal light on a measurement object;
    adjusting a light path length difference between the signal light and the reference light from a light path length of the signal light to the measurement object;
    superimposing a high-frequency current on a driving current to drive the light source;
    combining the signal light reflected or scattered by the measurement object and the reference light to generate a plurality of interference lights different from each other in phase relation; and
    detecting the interference lights,
    wherein in a state where the high-frequency current is not superimposed on the driving current, the light path length difference between the signal light and the reference light is adjusted, and when the high-frequency current is superimposed on the driving current by a high-frequency superimposing unit, measurement is performed.

10. The optical measurement apparatus according to claim 4, wherein the light path length adjusting unit includes a lens, a mirror arranged on a focal plane of the lens, and an actuator to modulate positions of the lens and the mirror.

\* \* \* \* \*